March 27, 1934.  E. L. CECIL  1,952,656

ROTATABLE CUTTER

Filed July 21, 1931

Inventor
Eugene L. Cecil
By
Attorney

Patented Mar. 27, 1934

1,952,656

UNITED STATES PATENT OFFICE 1,952,656

ROTATABLE CUTTER

Eugene L. Cecil, Washington, D. C., assignor of one-half to L. D. Wright, Washington, D. C.

Application July 21, 1931, Serial No. 552,248

6 Claims. (Cl. 29—104)

The invention is for an improved rotatable cutter for dressing the circumferential face of cylindrical objects and is particularly adaptable to the re-dressing of rubber printing press rollers after their faces have become worn or damaged from use, for which particular purpose the invention will be hereinafter described in the specification and illustrated in the accompanying drawing, though it may be used for dressing the faces of other objects which are made of material other than rubber, for instance, stone or wooden columns.

One of the objects of the invention is to provide a cutter of the character indicated which will remove the damaged face of a rubber roller and which may be adjusted with relation to the roller for merely skinning the outer surface of the rubber from the roller or for cutting to a considerable depth for removing pits or indentations in the face of the roller and leaving the roller in a smooth unbroken surface ready for polishing with soap stone dust or other polishing medium, and of uniform diameter throughout its entire length.

A further object of the invention is to provide a cutter which will dress the surface of a rubber roller while simultaneously preventing vibration of the body of the roller during the dressing operation.

A further object of the invention is to provide a cutter composed of a plurality of circular saw like cutters capable of extension or reduction transversely of its cutting face.

A still further object of the invention is to provide a cutter composed of a plurality of circular saw like cutters clamped together with the cutting teeth so arranged with relation to each other that the cutters following the advance cutter in its movement longitudinally of a rubber roller will function as follow up cutters and limit any tendency to outward movement or rebounding of the rubber due to the impact therewith of the advance teeth of the cutter.

Further objects and advantages of the invention will appear as the following specification of the invention proceeds.

The invention will be hereinafter fully set forth, described, and particularly pointed out in the claims.

In the accompanying drawing.

Like reference characters indicate like parts throughout the several figures of the drawing.

Figure 1:
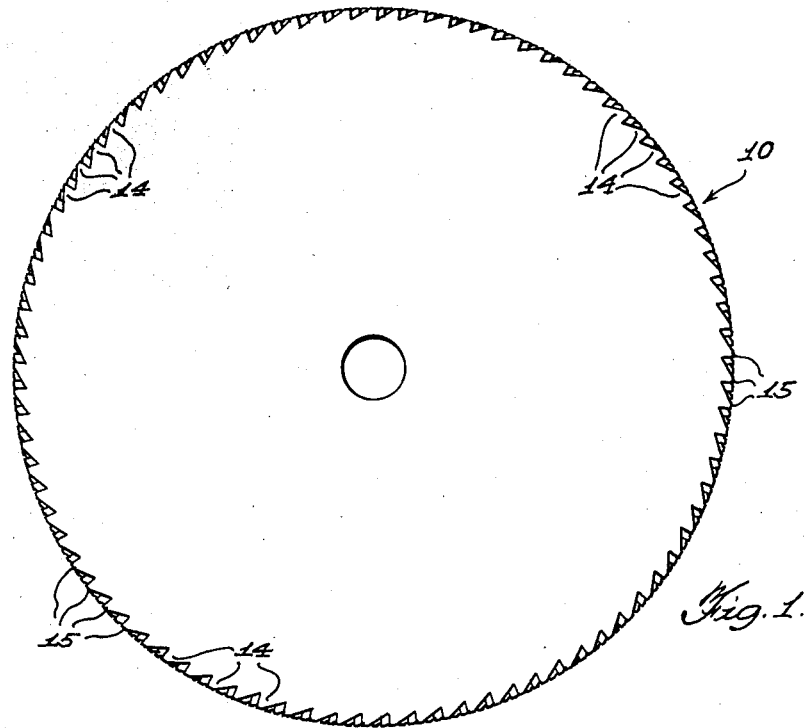
Figure 1 is an elevation of the broad face of the improved cutter.

Reference character 10 indicates the improved cutter generally which is shown as composed of three circular saw like discs 11, 12 and 13 of ⅛ inch in thickness, securely clamped together in any suitable manner, though any desired number of discs of varying thickness may be assembled to compose the cutter.

The discs are provided with teeth 14 equally spaced around the entire periphery thereof and are formed with an arcuate cutting face 15 on their cutting ends, the axis of the discs being concentric with the arcuate face of the teeth. The teeth of the individual disc following the teeth of the disc immediately in advance thereof, which make the progressive cut longitudinally of the roller, function as stops or guides against outward movement of the face of the roller due to the impact of the teeth of the disc immediately in advance thereof. The object of forming the cutting ends of the teeth arcuately is for the purpose of limiting the outward movement or rebounding of the rubber due to the successive contacts of the teeth with the roller, which results in dressing the roller to a true arc and imparting thereto a perfectly smooth and true surface.

Figures 3, 4:
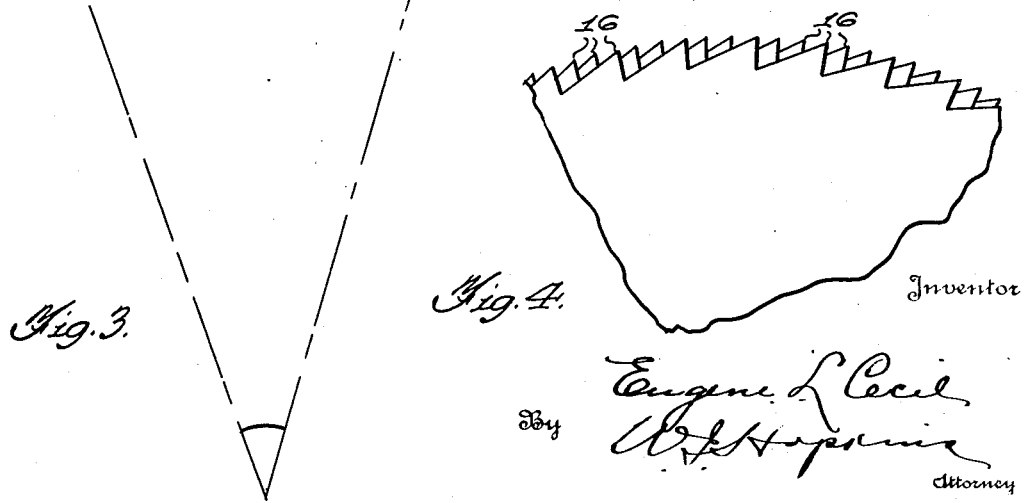
Figure 3 is an enlarged detail fragmentary view of Figure 1 more clearly showing the arcuate formation of the cutting ends of the teeth.
Figure 4 is a modified view in perspective showing the teeth having pointed ends.

Referring to Figure 3, it will be seen that due to the oblique alignment of the teeth 14 transversely of the face of the cutter of the arcuate ends of the teeth 14 of the several discs forming the cutter, the arcuate ends of the teeth form a guard or stop in diagonal alignment transversely of the cutting face of the cutter which will limit any tendency of an outward movement or rebounding of that portion of the rubber being cut, due to the impact of the teeth of the cutter with the roller. It is understood that the arcuate ends of the teeth exert no inward pressure on the newly cut portion of the face of the roller but function merely as a stop or guide to prevent the outward movement or rebound of the rubber which would necessarily result from the resiliency of the rubber forming the body of the roller.

It will be noted that the teeth of no two of the combined discs forming the cutter are immediately opposite each other, thus providing for a perfect follow up cut by the teeth of the discs successive to the advance disc which passes in the movement of the cutter longitudinally of a rubber roller, it being understood that what is meant by the advance disc is the disc making the initial cut in the rubber roller in its movement longitudinally thereof.

Rubber printing press rollers are very expensive and it has long been a serious problem to develop means for re-dressing the circumferential faces thereof after they have become worn or damaged from long use in order that they may be again used.

Applicant is perfectly aware that rotatable disc like cutters or abraders have been long in use for re-surfacing or facing various objects, such as wooden columns, stone columns and many other things, but re-surfacing a rubber roller presents an entirely new and different problem for the reason that from the very nature of the rubber composing the roller, the roller is exceedingly resilient and will react to the contact with the teeth of a cutter being rapidly rotated thereagainst, in a yielding or bounding movement, causing a vibration of the body of the roller which produces myriads of infinitesimally small protuberances and indentations on the face of the roller in the path of the cutter. By forming the cutting teeth with arcuate ends, it will be readily seen that as one tooth cuts the face of the roller with its forward cutting edge the arcuate end of the tooth of the next succeeding disc will hold the cut portion in advance of the next succeeding tooth of the next succeeding disc in aligned position to be engaged thereby on the identically same arc that the preceding tooth has cut into the face of the roller thereby preventing any rebound or expansion of the rubber resulting from the compression of the rubber caused by its contact with the preceding tooth.

It will be readily seen that applicant's device provides a guard or stop for limiting any tendency of outward movement of the rubber forming the roller for the full width of the cutter by arranging the teeth in staggered relation thereby forming a guard diagonally across the cutter in advance of the cutting edge of the teeth of the combined discs forming the cutter while exerting no pressure inwardly on the rubber forming the roller, thereby positively insuring the smooth dressing of a rubber roller in a true and unbroken arc from end to end.

The improved cutter is adaptable to mounting on any of the well known forms of lathes for reciprocal movement longitudinally thereof. Either of the outside discs functioning as the advance disc according to the direction of movement of the cutter, either to the right or to the left, longitudinally of the roller in response to the traversing mechanism of the lathe.

Applicant has made many and divers experiments extending over a considerable period of time in an endeavor to provide a cutter having teeth so formed on their cutting face as to avoid vibration of the roller when being ground or dressed, which vibration invariably results when an attempt is made to grind or dress a rubber roller with a cutter provided with the ordinary and well known teeth having either a broad cutting edge extending transversely of the teeth or rasp like teeth terminating in sharp points and has found that a cutter provided with a broad sharp cutting edge extending transversely of the teeth or the pointed rasp like teeth when applied to a rubber roller for grinding or dressing necessarily imparts vibration to the rubber body of the roller due to the impact of the teeth with the roller which results in a tendency to tear particles of rubber from the face of the roller leaving the face thereof in an unsatisfactory condition for polishing by reason of myriads of protuberances and indentations on the face of the roller due to the vibration thereof which results in a tearing action by the teeth of the cutter. Applicant has experimented with cutters having teeth of every conceivable formation of cutting face and was unable to overcome the vibration of the roller and the tearing or gouging effect of the rubber until he conceived the idea of providing a cutter having the ends of the teeth formed arcuately and the forward or cutting face of the teeth perpendicular to the axis of the cutter which cutter tooth formation has proven absolutely satisfactory during a long series of tests, leaving the rubber roller in a perfect condition to receive the final finishing or polishing step.

Figure 2:
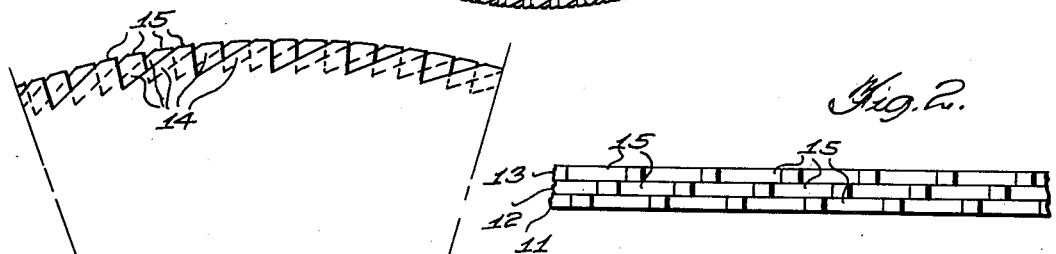
Figure 2 is an edge view thereof showing three circular saw like cutters clamped together with their teeth in oblique alignment transversely of the cutting face of the cutter.

Fig. 4 shows a modification of the cutter shown in Figs. 1, 2 and 3 in which the disks having pointed teeth 16 are clamped together forming a cutter having teeth 16 in staggered relation.

I claim:

1. A rotatable cutter comprising a plurality of discs having radial teeth arcuately formed at their cutting ends, said arcs being concentric with the axis of rotation of the cutter and the cutting faces of the teeth being radial thereto.

2. A rotatable cutter comprising a plurality of discs having radial teeth, said teeth having arcuate ends concentric with the axis of rotation of the cutter and the cutting face of the teeth being radial to the axis of rotation of the cutter.

3. A rotatable cutter comprising a plurality of discs having teeth formed around the periphery thereof, said teeth being arcuate on their ends and concentric to the axis of rotation of the disc with their cutting faces radial thereto.

4. A rotatable cutter comprising a plurality of discs having radial teeth, said teeth having their cutting faces radial to the axes of rotation of the discs and being arcuate on their ends, the arc of the ends of the teeth being concentric with the axes of rotation of the discs.

5. A rotatable cutter comprising a plurality of discs, tapering teeth, having arcuate ends, formed on the periphery thereof and the cutting face of the teeth being radial to the axis of rotation thereof, the cutting face of the teeth of one disc being in advance of the heel of the teeth of the adjacent disc forming bearing portions diagonally across the face of the cutter with substantially V-shaped recesses therebetween.

6. A rotatable cutter comprising a plurality of discs, tapering teeth having arcuate ends formed on the periphery of the discs, the cutting faces of the teeth being radial to the axis of rotation thereof and the faces of the teeth of one disc being in advance of the heel of the teeth of the adjacent disc forming an arcuate bearing portion diagonally across the face of the cutter.

EUGENE L. CECIL.